United States Patent [19]

Anderson et al.

[11] Patent Number: 5,558,254

[45] Date of Patent: Sep. 24, 1996

[54] CONTAINER FOR STORING AND TRANSPORTING RECYCLABLE AND NON-RECYCLABLE WASTE

[75] Inventors: Dennis C. Anderson, Northfield; Harold T. Hjermstad, II, Eden Prairie, both of Minn.

[73] Assignee: National Polymers Inc., Lakeville, Minn.

[21] Appl. No.: 382,644

[22] Filed: Feb. 2, 1995

Related U.S. Application Data

[63] Continuation-in-part of Ser. No. 128,989, Sep. 29, 1993, Pat. No. 5,390,813.

[51] Int. Cl.⁶ .................................................. A47G 19/00
[52] U.S. Cl. ........................ 220/527; 220/404; 220/909; 220/23.86
[58] Field of Search .................................. 220/404, 908, 220/909, 527, 23.86, 404, 527

[56] References Cited

U.S. PATENT DOCUMENTS

| | | | |
|---|---|---|---|
| D. 236,075 | 7/1975 | Golden et al. ........................... | D7/187 |
| 3,463,353 | 8/1969 | Peebles .................................... | 220/97 |
| 3,907,105 | 9/1975 | Nowak ..................................... | 206/216 |
| 4,653,713 | 3/1987 | Hamilton ................................. | 248/238 |
| 4,729,489 | 3/1988 | Papaianni ................................ | 220/23.8 |
| 4,834,253 | 5/1989 | Crine ....................................... | 220/909 X |
| 4,872,589 | 10/1989 | Englehart et al. ...................... | 220/410 |
| 4,878,592 | 11/1989 | Lee .......................................... | 220/909 X |
| 4,948,004 | 8/1990 | Chich ...................................... | 220/909 X |
| 4,974,746 | 12/1990 | Dickinson ............................... | 220/404 |
| 5,005,727 | 4/1991 | Roth ........................................ | 220/404 |
| 5,076,462 | 12/1991 | Perrone ................................... | 220/404 |
| 5,086,917 | 2/1992 | Dziersk et al. ......................... | 206/216 |
| 5,088,750 | 2/1992 | Beese et al. ........................... | 280/47.26 |
| 5,092,480 | 3/1992 | Waterston ............................... | 220/909 X |
| 5,111,958 | 5/1992 | Witthoeft ................................ | 220/909 X |
| 5,193,708 | 3/1993 | Prout et al. ............................. | 220/908 X |
| 5,284,268 | 2/1994 | Marsan et al. .......................... | 220/909 X |
| 5,417,338 | 5/1995 | Roy et al. ............................... | 220/909 X |

*Primary Examiner*—Steven M. Pollard
*Attorney, Agent, or Firm*—James V. Harmon

[57] ABSTRACT

A combined waste recycling and disposal method utilizes a first container or bin having at least one supporting wheel for supporting the bin from the ground. Waste of a first category, e.g., garbage, is stored in the bin. A second container is provided for waste of a second category, specifically, recyclable waste. Waste of the second category is placed in and stored in the second container. The second container is supported on the first container and thereafter the first container is transferred to a pickup point while loaded with both recyclable and non-recyclable waste by moving the first container while it is supported by the wheels. The second container is then removed from the first container and the waste from both containers is transferred to separate compartments of a pickup vehicle, e.g., a truck for hauling the waste to a recycling and a disposal location. The second container is a rigid receptacle with two or more side-by-side compartments for recyclable waste. The rigid receptacle is constructed and arranged to be removably supported within the top portion of the bin.

3 Claims, 7 Drawing Sheets

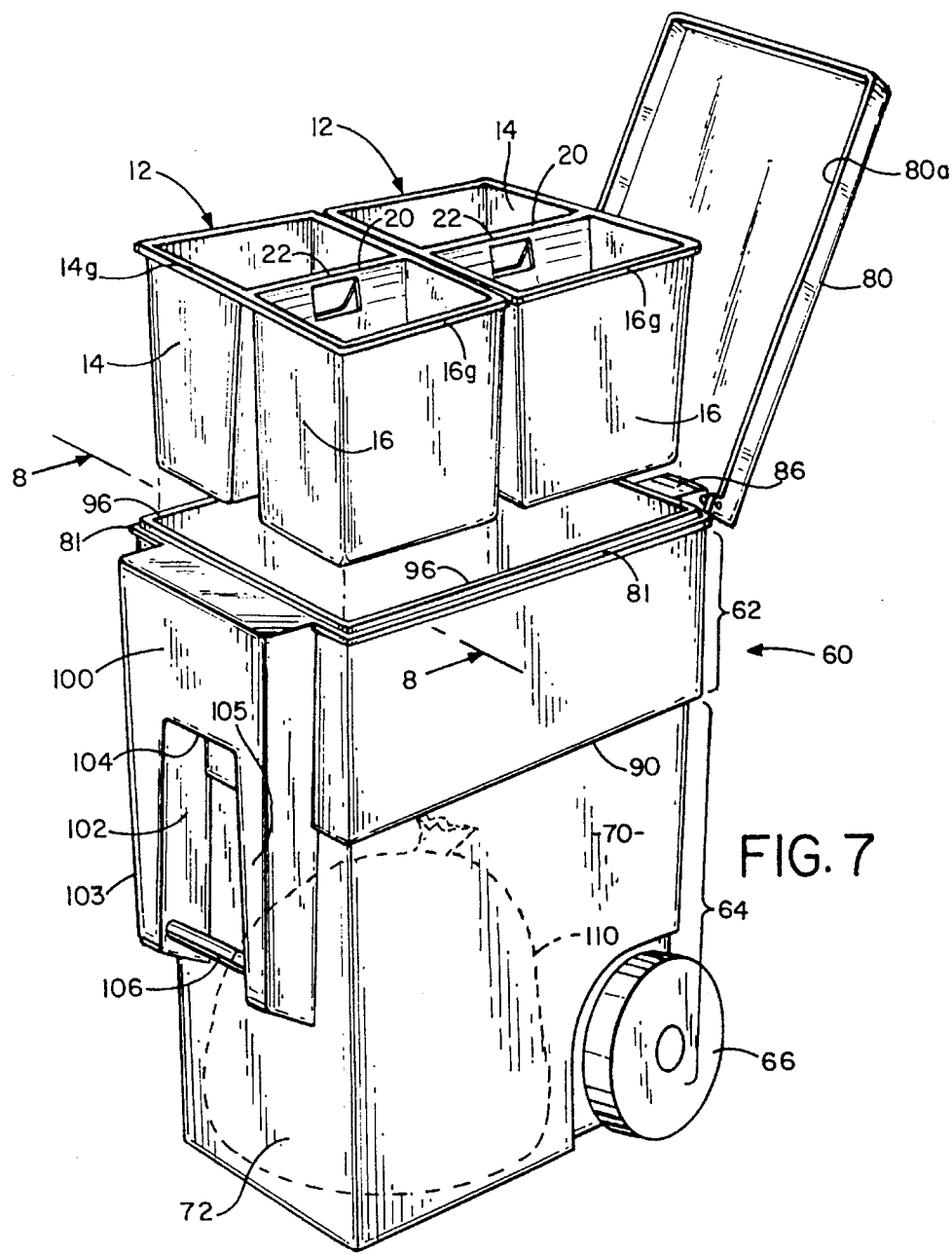
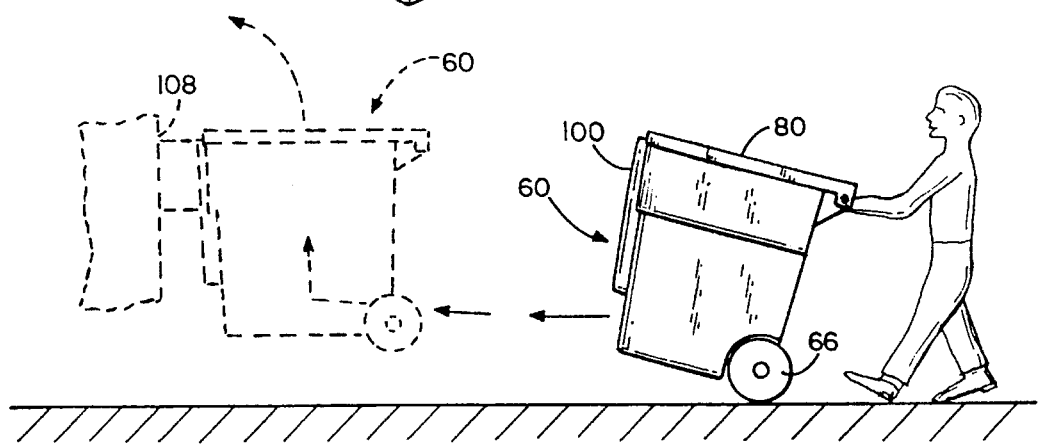

5,558,254

1

CONTAINER FOR STORING AND TRANSPORTING RECYCLABLE AND NON-RECYCLABLE WASTE

This is a continuation-in-part of application Ser. No. 08/128,989 filed 09/29/93, now U.S. Pat. No. 5,390,813.

FIELD OF THE INVENTION

This invention relates to a container for holding and transporting both recyclable and non-recyclable waste.

BACKGROUND OF THE INVENTION

The practice of recycling household waste has recently been adopted throughout the United States and in many other countries. This revolution in the handling of waste has resulted in the need for a recycling container that is easy to carry, and in one preferred form is stackable, i.e., is constructed in such a way that several of the containers can be nested one inside the other and more specifically, has a carrying handle that will not interfere with good stacking characteristics.

The garbage and recycling industry has made a commitment to provide a co-mingled recycling recovery program in which mixed recyclables are collected. As a result, hundreds of material recovery facilities are now operating or are under construction. In these programs, recyclable waste is collected at the point of generation and is then delivered to a recovery facility where material is separated, processed and end-marketed.

One problem that has not been solved is the inconvenience associated with transporting both recyclable and non-recyclable waste from a residence or other building to a pickup point, e.g., on the street in front of a residence or commercial building, and for enabling both kinds of waste to be picked up simultaneously.

In view of the deficiencies of the prior art, one object of the invention is to provide a new method and container for storing and simultaneously transporting two categories of waste material; namely, recyclable and non-recyclable waste from the home or commercial building to a nearby pickup point, typically to the curb in front of the building where it can be picked up by a truck used for hauling it to a recycling and disposal site.

Another object is to minimize the labor required in handling and carrying recyclable materials that are deposited in such a container.

A further object is to maximize saving of space by providing a recyclable waste container that can be placed very close to the point where recyclable materials are generated, e.g., in a family room, den, laundry, basement or kitchen, e.g., in a cabinet beneath the kitchen sink, together with a way of transporting it along with non-recyclable waste to a pickup point.

It is another object of the present invention to provide a recycling container suited for co-mingled recycling by assisting in the separation of recyclable materials into two categories in a home or commercial building so that the container can be used as a recovery and storage container for recyclable waste either in the home or in a commercial site.

Another object is to find a new method that will allow storing and simultaneously transporting both the recyclable and the non-recyclable waste to a pickup point by means of a container that enables it to be dumped into a truck having separate storage compartments for segregated recyclable and non-recyclable waste.

These and other more detailed and specific objects of the present invention will be better understood by reference to the following figures and detailed description which illustrate by way of example but a few of the various forms of the invention within the scope of the appended claims.

SUMMARY OF THE INVENTION

The invention provides a container for both waste recycling and waste disposal. In one preferred method of using the invention, a first container is provided with a wheel means including at least one supporting wheel for supporting the container from the ground. Waste of a first category, e.g., garbage is stored in the first container. A second container is provided for waste of a second category, specifically, recyclable waste. Waste of the second category is stored in the second container. The second container is removably supported on the first container and thereafter the second container is transferred to a pickup point while loaded with both recyclable and non-recyclable waste by moving the first container while it is supported by the wheel means. The second container is then removed from the first container and the waste from both containers is transferred to separate compartments of a pickup vehicle such as a truck which then hauls the waste to recycling and disposal locations.

In a preferred form of the invention, the first container is a wheeled service bin used for holding and transporting the recyclable and non-recyclable waste. The bin is formed from rigid material with side and bottom walls and a mouth at the top. At least one removable receptacle is provided to hold recyclable waste. The removable receptacle is constructed and arranged to be supported by and preferably within the bin. The bin has a compartment preferably located below the removable receptacle for holding the non-recyclable waste. In a preferred form of the invention, each removable receptacle is provided with a pair of compartments for holding two classes of recyclable waste. The bin is preferably arranged to hold a pair of the removable receptacles so that as many as four categories of recyclable waste material can be transported to the pickup point together with non-recyclable waste, i.e., garbage and trash held in the compartment of the bin.

THE FIGURES

FIG. 7 is a perspective view of another embodiment of the invention with a pair of containers of FIGS. 1–6A as they appear just before being installed therein;

FIG. 13 is a side elevational view on a smaller scale of the service bin as it is being transported to a pickup point and then dumped into a collection vehicle (dashed lines).

DETAILED DESCRIPTION OF THE INVENTION

Figure 1:
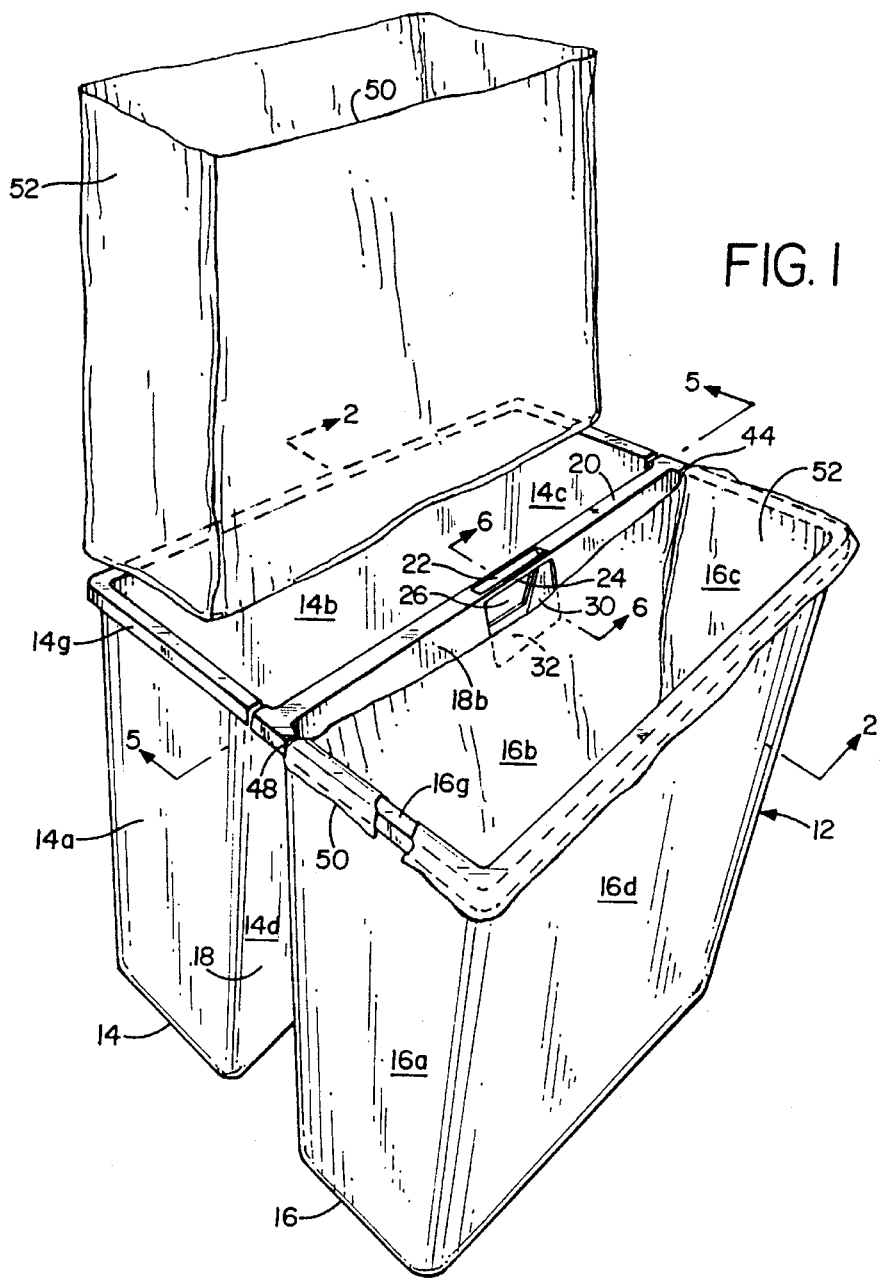
FIG. 1 is a perspective view of the invention as it appears with an optional liner placed in one compartment thereof.
Figure 6A:
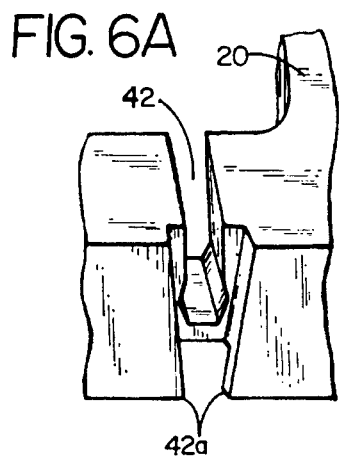
FIG. 6A is a partial perspective view of one of the retaining slots as seen from the outside of the container.
Figure 6:
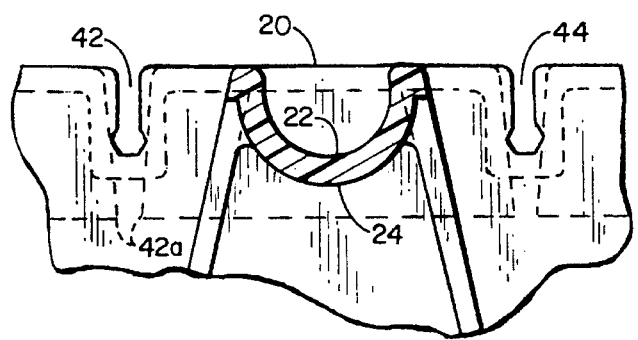
FIG. 6 is a greatly enlarged partial vertical sectional view taken on line 6—6 of FIG. 1.

Refer now to FIGS. 1–6A in which is illustrated by way of example one preferred form of recycling container for sorting waste products such as paper bags, newspapers, cans, bottles and the like. The preferred container indicated generally at 12 has two side-by-side compartments 14 and 16 separated by a hollow partition 18. Container 12 is preferably a monolithic body formed from plastic resin in which the compartments 14 and 16 are integral with one another. The compartment 14 includes four upright side walls 14a, 14b, 14c and 14d and a bottom wall 14e. The compartment 16 has four upright side walls 16a, 16b, 16c and 16d and a bottom wall 16e. Each of the compartments 14 and 16 has an upper open wide mouth surrounded by a rim (14f and 16f). The bottom walls 14e and 16e can have drain holes 14f' and 16f'.

The side walls of each compartment 14, 16 preferably converge toward one another proceeding in the direction of the bottom of the container to facilitate stacking as shown in the figures. Two of the side walls 14d, 16b are spaced apart from one another to define the sides of the hollow partition 18. Near the top of the partition 18 the walls 14d, 16d converge proceeding upwardly at 18a, 18b (FIG. 2) and are joined to one another at their upper edges by means of a horizontally disposed, laterally extending integral connecting panel 20 located at the same elevation as the upper edge of the mouths surrounded by the rims 14f, 16f of the respective compartments 14 and 16. The rims 14f, 16f of the compartments 14 and 16 are each preferably surrounded by outwardly extending downwardly recurved lips 14g and 16g, respectively. The lips can be strengthened with reinforcing webs 15. The lips 14g, 16g strengthen the container 12 and also provide a hand grip to assist in carrying the container.

At the center of the connecting panel 20 is a horizontally disposed laterally extending handle 22 having the shape of a half-cylinders, i.e., the handle 22 is hemi-cylindrical so as to have a downwardly extending convexly curved lower surface 24 for providing a comfortable grip. The upper surface of the handle 22 is trough-shaped, i.e., the handle 22 has an upwardly opening recess and a downwardly, convexly curved lower surface. Below the handle 22 is a transversely extending rectangular opening 26 in each of the converging portions 18a, 18b of the walls 14d, 16b. The opening 26 is provided with upright side walls 28, 30 (FIG. 5) but has no bottom wall at 32. As a result of this construction the handle 22 provides a very comfortable grip and is located at or slightly below the rims 14f, 16f of compartments 14, 16. The rims 14f and 16f of the compartments 14, 16 and the connecting panel 20 form a uniplanar top surface for the container 12 which includes the handle 22. By the term uniplanar is meant, lying in the same plane.

Figure 2:
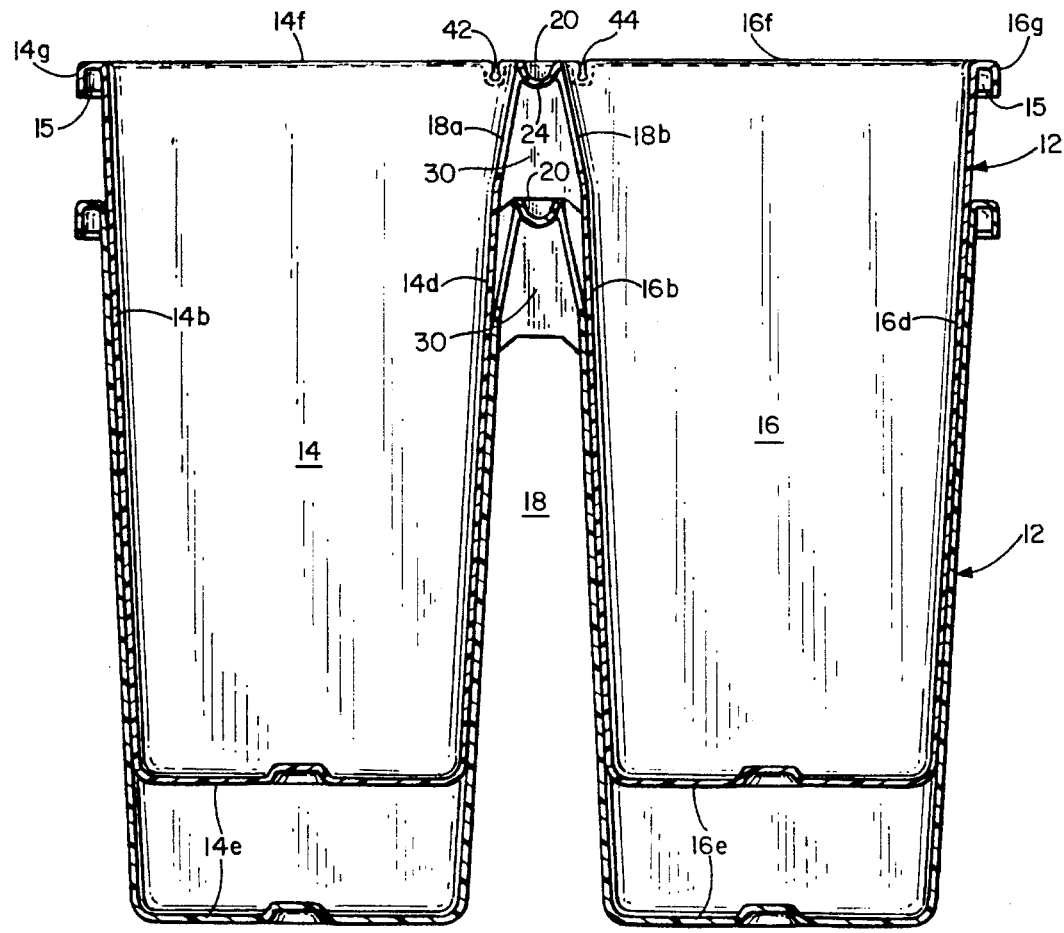
FIG. 2 is a transverse vertical sectional view taken on line 2—2 of FIG. 1 also showing the stacking of two of the containers.
Figure 3:
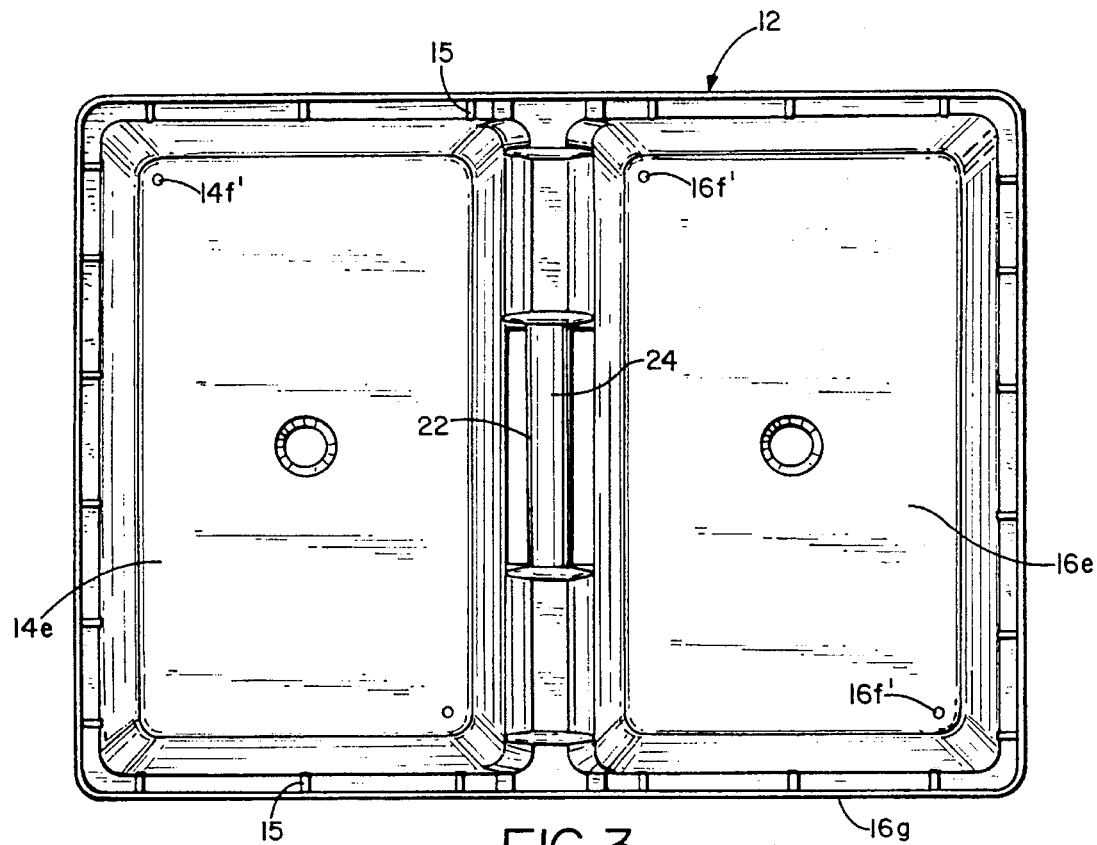
FIG. 3 is a bottom view of the container.
Figure 4:
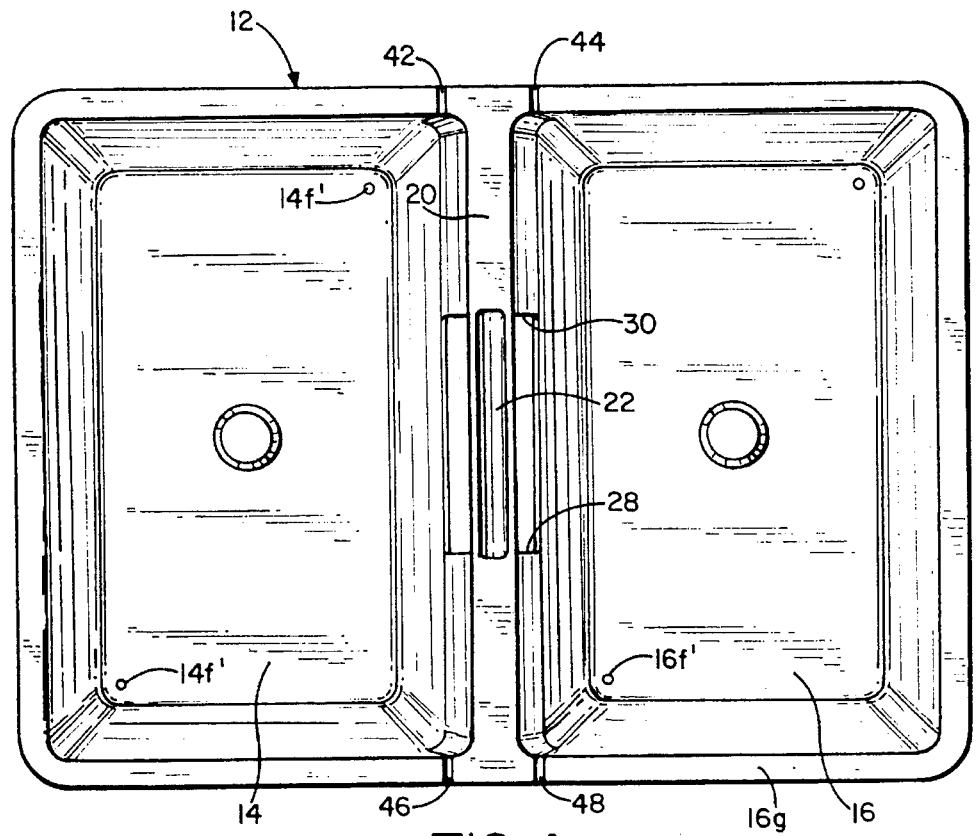
FIG. 4 is a top view of the container.

One can easily place one's hand through the opening 26 beneath the handle but at the same time the handle is substantially the same elevation as the top edge of each of the compartments 14 and 16. It should be noted that the handle 22 does not project above the upper edges of compartments 14, 16 or lips 14g, 16g. In addition, the handle 22 does not interfere with nesting of the containers. Thus, two or more of the containers 12 can be placed easily one inside of another as shown in FIG. 2. This gives the container 12 of the present invention excellent stacking characteristics so as to facilitate shipment and storage.

Figure 5:
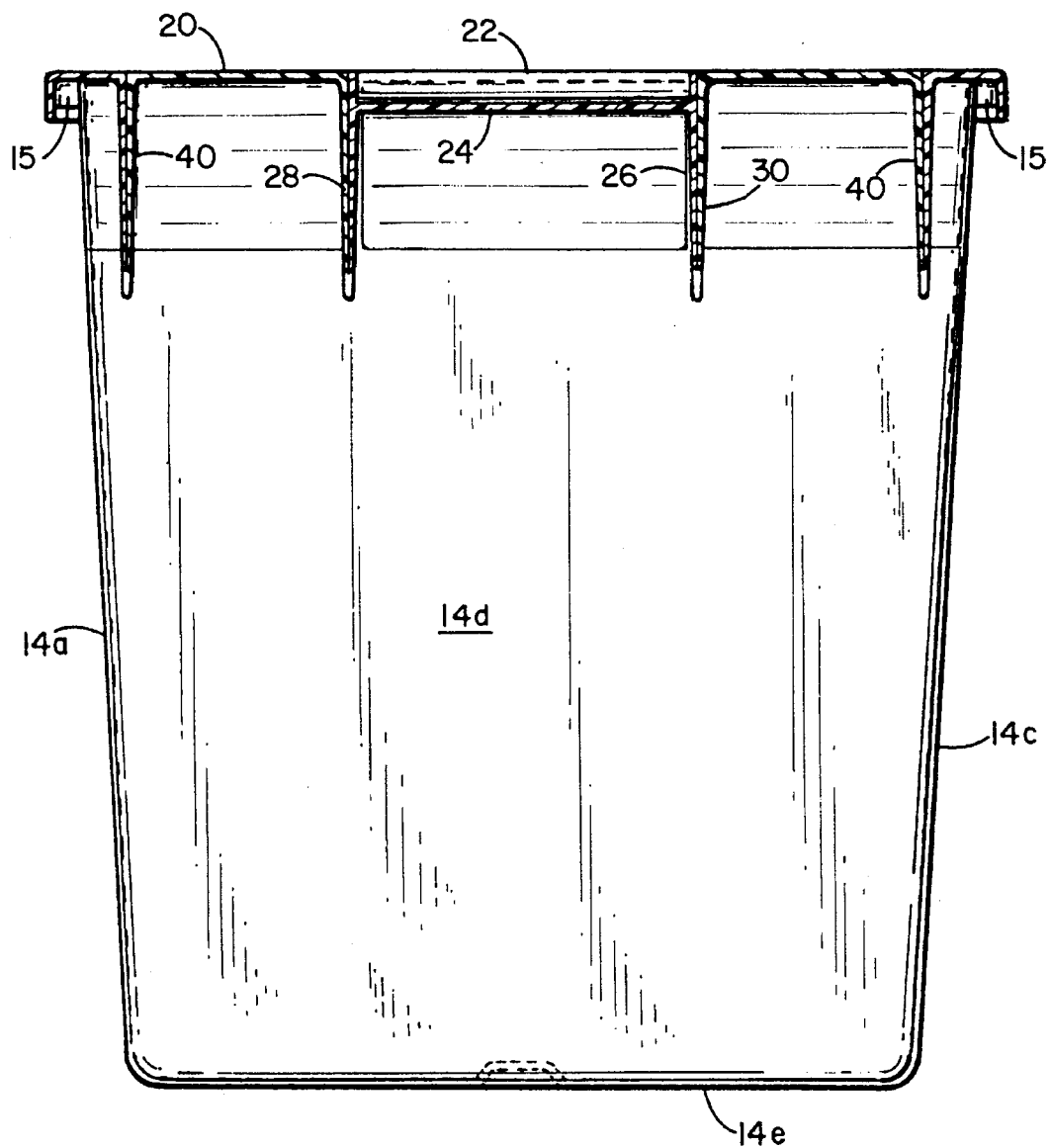
FIG. 5 is a transverse vertical sectional view taken on line 5—5 of FIG. 1.

Upright reinforcing webs 40 are preferably provided spaced apart at locations beneath the connecting panel 20 to furnish added strength. As shown in FIG. 5 the reinforcing webs 40 extend downwardly to approximately the lower edges of the tapered side walls 18a, 18b.

Located adjacent either end of the connecting panel 20 in the lips 14g, 16g of the respective compartments are provided, if desired, optional downwardly extending upwardly opening bag retaining slots 42, 44, 46 and 48 for receiving the upper edge 50 of an optional liner bag such as a flexible plastic film liner bag 52 which is commercially available in various sizes for lining wastebaskets and the like in the lip portions 14g, 16g of the container 12 are provided upright openings which are aligned with the slots 42–48. The edges of these openings converge proceeding downwardly to provide sharp corners 42a (FIGS. 6 and 6A) which act as hooks for securely holding the top 50 of a liner bag 52 in place. If the liner bag 52 is to be used, the bag is inserted into one or both of the compartments 14, 16 and the edge portion 50 of the top of the bag 52 adjacent to the partition 18 is turned downwardly into one of the slots 42–46 and its edge is stretched under one of the hooks 42a on either side of the container 12. The hooks 42a securely and reliably hold the bag 52 in place. The other edge of the bag 52 is stretched over the lip 14g, 16g as shown at the right in FIG. 1 to provide a tight fit and secure support for the upper edge 50 of the liner bag 52. The top edge 50 of bag 52 can be hooked into the slots on the same or opposite side of the panel 20 from the compartment in which the bag 52 is placed. By hooking the edge of the bag 52 in a slot on the opposite side of the panel 20, the bag 52 is stretched further and thus can be hooked more securely. This will keep the bag 52 from sliding down even if articles are thrown into it.

The aspect of the invention illustrated in FIGS. 1–6A provides an excellent container to assist in the sorting of recyclable materials. It is particularly valuable in making possible at least partially presorting articles into two groups at the source. For example, the compartment 14 can be lined with a paper bag and be used for fiber (paper commodities, newsprint, magazines, mail, phone books, etc.) while the compartment 16 can be lined with a flexible plastic waste bag, i.e., a wastebasket liner bag and then used for glass jars, metal beverage and food cans, plastic and glass bottles. Either or both compartments can be provided if desired with a liner bag 52.

In accordance with one aspect of the present invention, a new method is provided for recycling recyclable waste products. In accordance with the present method, a recycling container of any suitable known construction but for convenience exemplified by the container 12 is provided with a pair of side-by-side compartments 14, 16, each with an upwardly opening wide mouth. The container 12 or other suitable container known in the art serves as a means to facilitate presorting the recyclable materials into two product categories: and thus makes it possible for a householder to conduct in the home the first stage of separation that is to be completed by the recycler. Typically, in the first compartment 14 the user places recyclable fiber products including paper commodities, newsprint, magazines, paper bags, mail, phone books, etc. In the other compartment 16 the user places rigid and semirigid recyclable containers including glass jars, metal beverage and food cans, as well as plastic and glass bottles. The recycling container 12 is then taken to a pickup point, usually in front of the home near the street in the manner to be described. The recycling contractor then removes the presorted recyclables from the compartments 14, 16, while maintaining them separate from one another. Further separation of recyclable materials as required can be carried out by the recycling contractor.

The container 12 is excellent for use both in the home and in commercial installations. In the home it can easily be slid into a compartment under the sink, at the point where most waste originates. It will be seen that since the handle 22 is at the same level as the top of the rims 14f and 16f of the compartments and extends slightly below that level, it will not project above the top of the compartments 14 and. 16 and consequently will not catch on obstructions when the container is being placed in or removed from storage. The slots 42–46 in the top rim of the compartments 14, 16 are highly effective in efficiently holding the tops of the liner bags 52 in place, especially if the user should decide to store non-recyclable waste or for some other reason want to line one or both of the compartments 14, 16.

While most currently available containers are difficult to carry, the container 12 of the present invention can be easily lifted and carried with one arm which makes more efficient use of the back muscles and thus reduces labor involved in carrying the recycling container 12 to the street.

The handle 22 is constructed and designed to provide a comfortable grip for the hand but yet does not interfere with efficient nesting of the containers one inside another as shown in FIG. 2.

Refer now to FIGS. 7–13 which illustrate another aspect of the invention.

As seen, for example in FIG. 7, the present invention also provides a second container, more specifically a service bin indicated generally at 60 which includes two container portions: an upper container portion 62 for holding one or more (in this case, two) recycling containers 12 that contain recyclable waste; and a lower portion or compartment 64 for holding non-recyclable waste or garbage, most conveniently held in its own receptacle, e.g., a flexible plastic bag 110. The bin 60 is provided with a wheel means, in this case a pair of laterally spaced apart wheels 66 supported for rotation on an axle 66a that extends horizontally through the bottom of the bin 60. While two wheels 66 are shown, it would also be possible to use a single wide wheel rather than two wheels. As shown, the wheels 66 are spaced apart, one on either side of the container adjacent a rear wall 68.

Figure 8:
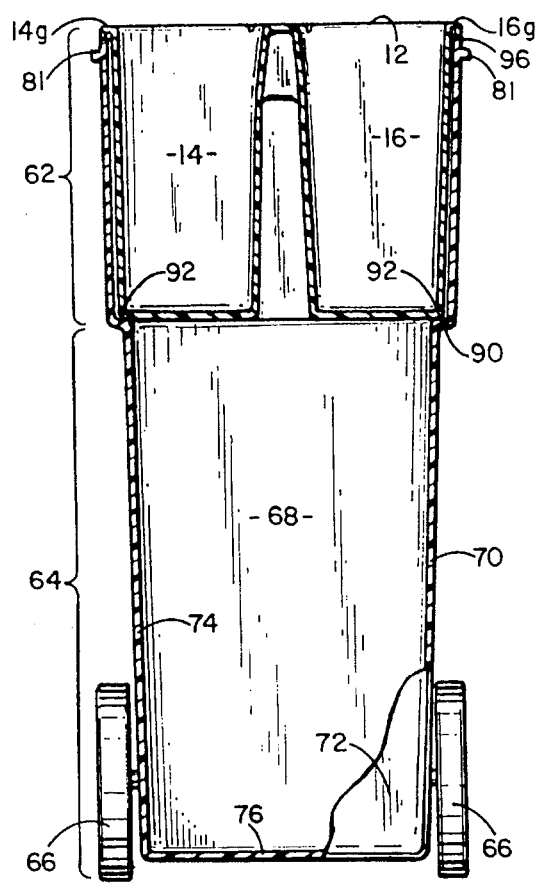
FIG. 8 is a vertical cross-sectional view taken on line 8—8 of FIG. 7 with one of the containers 12 of FIGS. 1—6A in an installed position in a service bin.
Figure 9:
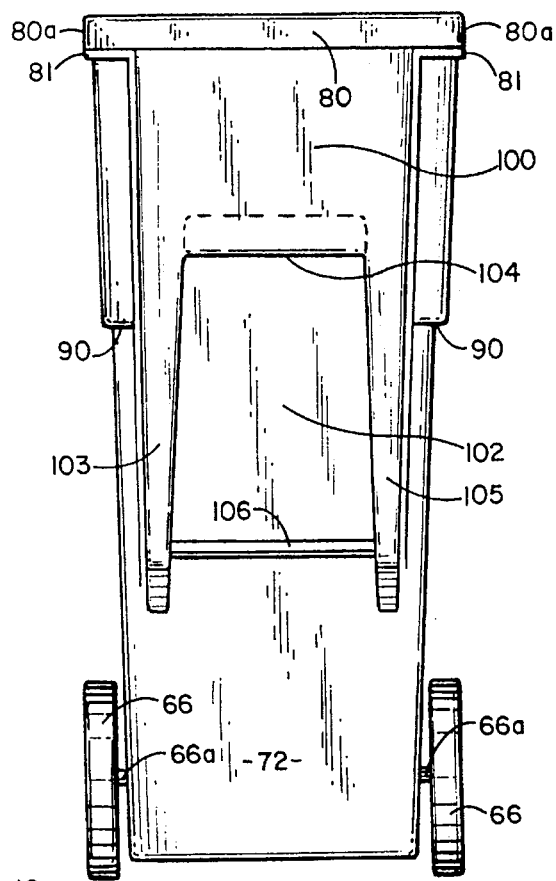
FIG. 9 is a front elevational view of the service bin of FIG. 7 with the cover shown in the closed position.
Figure 10:
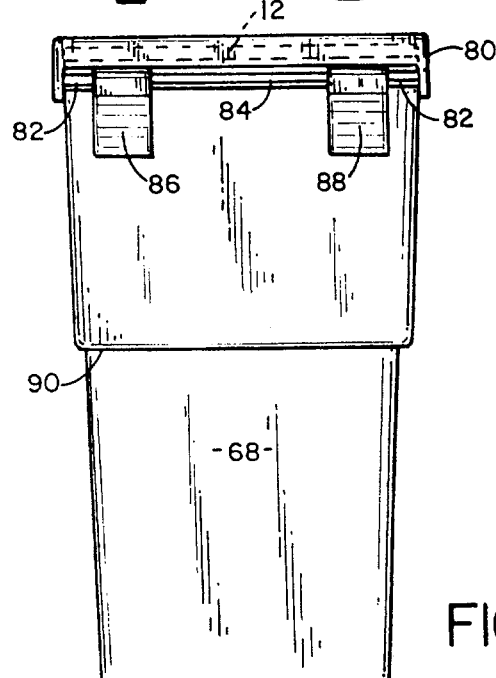
FIG. 10 is a rear elevational view of the service bin of FIG. 7 with the cover shown in a closed position.
Figure 11:
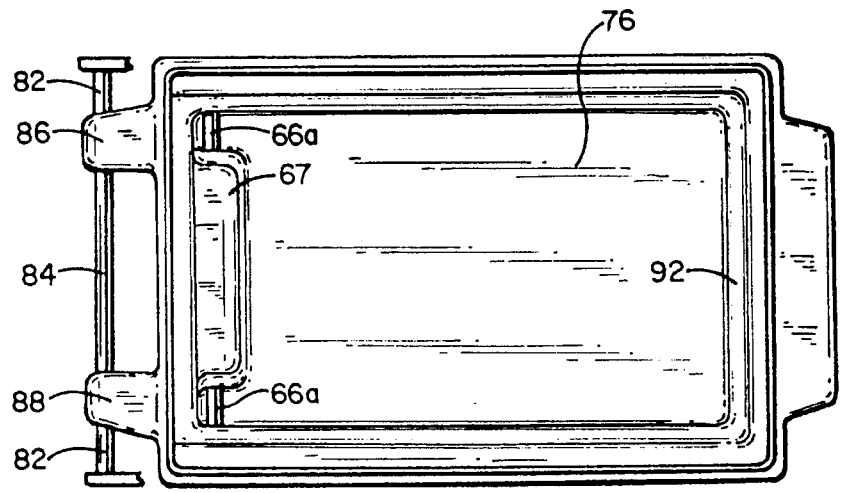
FIG. 11 is a top view of the service bin in accordance with the invention with the cover removed.
Figure 12:
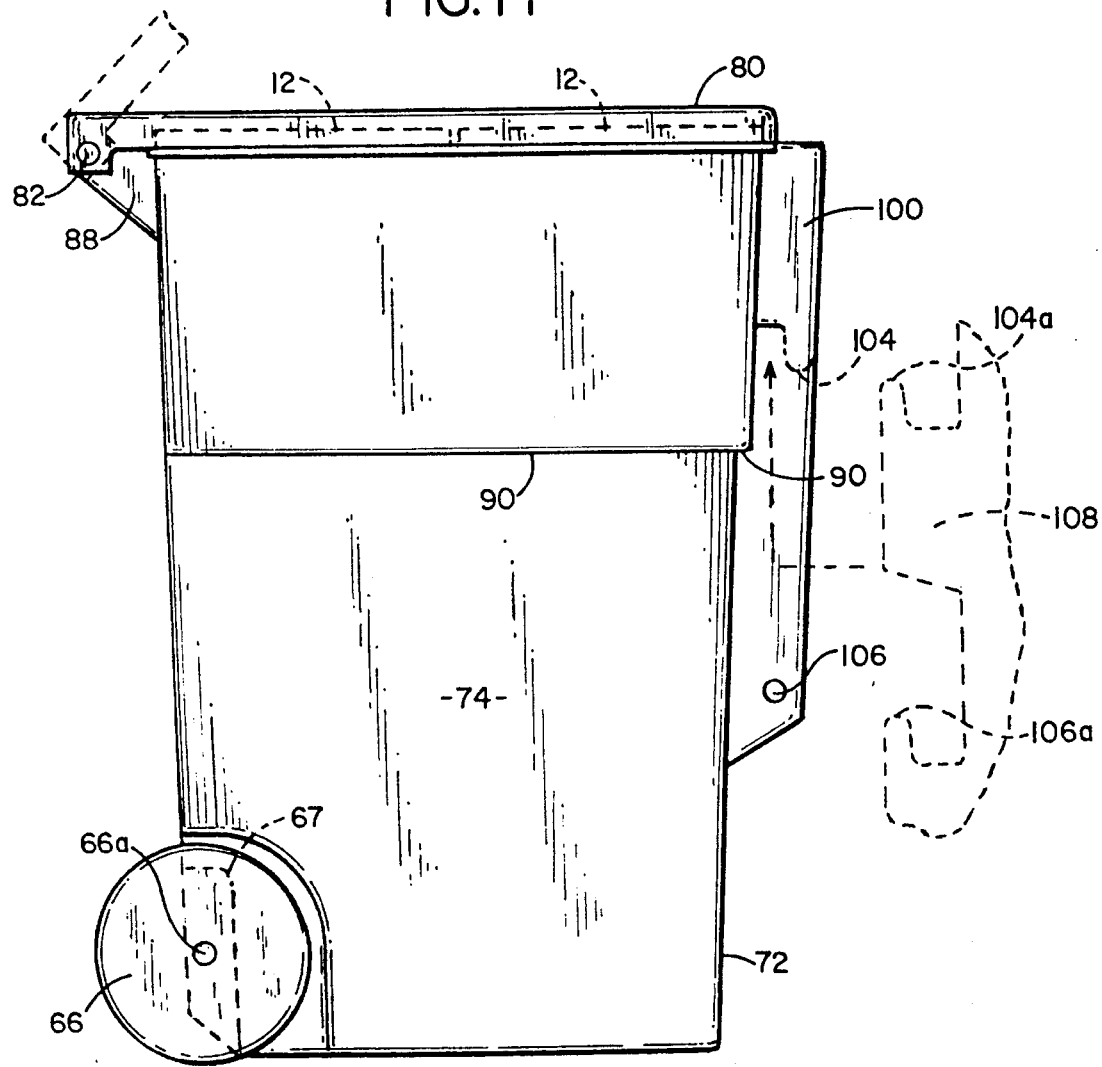
FIG. 12 is a side elevational view of the service bin of the present invention with the cover in the closed position.

The bin 60 includes four generally upright but slightly outwardly inclined side walls 68–74 which are connected together at their edges and to a horizontal bottom wall 76 (FIG. 8). The bin 60 has an upper open wide mouth 96 of rectangular shape surrounded by a laterally projecting horizontal upper rim 81 on the outside surface of the bin 60. A cover 80 is provided for closing the mouth 96. The cover 80 includes a downwardly projecting rectangular lip 80a which is supported by the rim 81 when the cover 80 is in a closed position. The cover 80 is pivotally mounted on the ends 82 of a pivot pin 84 supported by brackets 86, 88 that are integral with the bin 60. The center portion of the pin 84 also serves as a handle by which the user can hold the top of the bin with his hands for transporting the bin to a pickup point as shown in FIG. 13. The cover 80 is shown in a raised position in FIG. 7 and in the closed or lowered position in FIGS. 9, 10, 12 and 13. The cover 80 is partially elevated as shown by dotted lines in FIG. 12. The upper portion 62 of the bin 60 is slightly larger in cross-section than the lower portion or compartment 64 as indicated at 90 to provide an upwardly facing, peripherally extending, inwardly projecting shoulder 92 as seen in FIGS. 8 and 11 for supporting the bottom edges of the recycling containers 12 when they are inserted into the top portion 62 of the bin 60. The shoulder can be thought of as a support means for the removable container 12. The rims 16g of the containers 12 are also supported by the edge of the mouth 96 of the bin 60 as shown in FIG. 8.

The front wall 72 of the bin 60 is provided with a forwardly offset projection 100 with a central opening 102 bounded on either side by walls 103 and 105. In the projection 100 above the opening 102 is a horizontally disposed, downwardly projecting coupling or lifting bracket 104. At a lower elevation extending horizontally between the side walls 103 and 105 is a lifting bar 106. During use, when the bin 60 is to be dumped, the lifting bracket 104 and lifting bar 106 are engaged by suitably shaped upwardly directed hooks 104a and 106a, respectively, of a lifting implement 108 of suitable known construction that is a part of a truck or other vehicle (not shown) in which the bin 60 is to be dumped. Thus, during the dumping operation, the hooks 104a, 106a engage the bracket 104 and lifting bar 106, respectively, as the implement 108 lifts the bin 60 to the dumping position shown in FIG. 13. The bin 60 is preferably a unitary monolithic body formed from molded plastic resin, e.g., high density polyethylene formed by rotational molding with or without fiber reinforcement.

The manner in which the invention is used will now be described.

The rigid recycling containers exemplified by container 12 can be kept in any suitable location in a building, e.g., in a kitchen or basement. The bin 60 is usually kept in a storage shed or garage. Rigid recyclable waste is generally generated in the kitchen. Newspapers and unsolicited mail, on the other hand, are often generated in other living spaces in the home, e.g., the den or family room. It is not unusual to have one of the recycling containers 12 located in the kitchen and another similar container 12 in one of the other rooms, e.g., in a den, family room or basement. As already described, one compartment of the container 12 can be used for rigid recyclables and the other compartment for paper products, e.g., newspapers and paper bags. During the week, these waste materials are placed in the appropriate compartments of the containers 12 for storage.

Non-recyclable trash and garbage is collected separately as it accumulates and is placed in a suitable receptacle such as a flexible plastic garbage bag 110 (FIG. 7). When the time comes to move the accumulated waste to a point where it can be picked up, typically at the curb in front of the home or other building, the non-recyclable trash which is in one or more of the bags 110 is placed in the lower portion or compartment 64 of the bin 60. The containers 12 filled with recyclable waste are then placed in the upper portion 62 of the bin 60 as shown in FIG. 8. The bin 60 containing both recyclable and non-recyclable waste is then transferred to the street or other pickup point where it remains until a pickup vehicle, e.g., a truck having a lifting implement 108, arrives. The vehicle operator then manually removes the recycling containers 12 from the upper portion 62 of the bin 60 and, while the recyclable waste is placed in appropriate compartments of the vehicle, the lifting implement 108 elevates the bin 60 to a dumping position and inverts the bin 60 so that the non-recyclable trash and garbage in the receptacle 110 is automatically dumped out of the bin 60 into the pickup vehicle. The vehicle operator, who by this time has emptied the recyclables from the containers 12, then replaces them in the top portion 62 of the bin 60 as shown in FIG. 8.

The invention thus provides a dual-purpose container or bin for both recyclable and non-recyclable waste. The invention also eliminates multiple trips to the curb in front of the house or other building by allowing the user to move both kinds of waste in a single trip. In addition, the recycler can transfer both recyclable and non-recyclable waste into the same truck at the same time. Once the bin has been emptied, the entire assembly comprising the bin 60 and the recycling containers 12 can be simultaneously wheeled back to the house or other building. In this way, the invention provides greater convenience both for the resident of the building where waste accumulates as well as the operator of the vehicle that picks up the waste. The truck or other vehicle on which the lifting implement 108 is provided can then transport both the recyclable and non-recyclable waste to a central location for recycling and disposal.

Many variations of the present invention within the scope of the appended claims will be apparent to those skilled in the art once the principles described herein are understood.

What is claimed is:

1. A wheeled service bin assembly for holding and transporting recyclable waste and non-recyclable waste comprising, a unitary bin body formed from a rigid material with connected side walls, a horizontal bottom wall, and an upper open wide mouth and having an upper portion and a lower portion that are integral with one another, the upper portion of the bin body defines a compartment for holding a plurality of recycling receptacles in side-by-side relationship which completely fill the upper compartment when inserted therein, the lower portion of the bin body defines a lower compartment for holding non-recyclable garbage and waste below the recycling receptacles, the bin includes a support for holding the recycling receptacles next to each other in the upper portion of the bin, the recycling receptacles are removably supported for holding recyclable waste in the upper portion of the bin, each of the recycling receptacles includes a receptacle body having a bottom wall, connected side walls terminating in an upper open wide mouth, a centrally located upright, hollow, downwardly opening partition dividing the receptacle into a pair of side-by-side upwardly opening wide-mouthed compartments each bounded upwardly by an upper edge, and a handle located between the compartments proximate the upper edges thereof, supporting wheel means rotatably mounted at the bottom of the bin body for supporting the bin from the ground, said non-recyclable waste comprising garbage or trash is placed in the lower compartment by inserting the non-recyclable waste into the bin body when the recycling receptacles are removed from the upper compartment and the garbage and trash is covered by the receptacles when the receptacles are in place in the bin, said recycling receptacle thereby providing at least four compartments for holding at least four kinds of recyclable waste in the upper compartment of the bin body, whereby the bin containing both the recyclable and non-recyclable trash or garbage can then be transported to the street or other pickup point with the receptacles covering the trash or garbage.

2. The wheeled service bin assembly of claim 1 wherein the bin is provided with a bracket that serves as a coupling for enabling the bin to be elevated by a lifting implement for dumping the contents thereof into a pickup vehicle such that the receptacles can be removed manually from the bin for transferring recyclable waste therefrom and the non-recyclable trash and garbage contained in the bin can then be raised by a lifting implement to elevate the bin to a dumping position for removing the non-recyclable trash and garbage therefrom.

3. The wheeled service bin assembly of claim 1 wherein each of the receptacles comprises a monolithic container body formed from molded plastic resin, said compartments are left and right upwardly opening side-by-side compartments, each receptacle includes a horizontally disposed laterally extending connecting panel at the upper end of the partition, and a portion of the horizontally disposed connecting panel defines the handle.

\* \* \* \* \*